United States Patent [19]

Tine et al.

[11] 3,955,647

[45] May 11, 1976

[54] ADJUSTABLE CONTROL AND LOCK MEANS THEREFOR, SUCH AS FOR USE WITH AN AIR-OPERATED LUBRICATOR

[75] Inventors: Sebastian David Tine, Lawrence; Albert W. Dewberry, Boxford; Alfred S. Schommer, Lowell, all of Mass.

[73] Assignee: Watts Regulator Company, Lawrence, Mass.

[22] Filed: Sept. 16, 1974

[21] Appl. No.: 506,296

Related U.S. Application Data

[62] Division of Ser. No. 315,496, Dec. 15, 1972, Pat. No. 3,841,438.

[52] U.S. Cl. ............................ 184/56 R; 151/2 R; 251/89; 251/111
[51] Int. Cl.² ...................... F01M 1/16; F16N 7/34
[58] Field of Search ............... 184/55 A, 55 R, 7 D, 184/7 E, 7 F, 56 R, 56 A, 29, 32, 39, 42, 48 R, 48 A; 92/13.6, 13.7, 13.8, 17; 251/89, 111; 151/2 R, 2 A, 27, 28

[56] References Cited
UNITED STATES PATENTS

| | | | |
|---|---|---|---|
| 955,652 | 4/1910 | Melvin | 184/48 R |
| 1,022,657 | 4/1912 | Buttner | 151/28 |
| 1,532,603 | 4/1925 | Russell et al. | 151/2 R |
| 1,622,203 | 3/1927 | Napier et al. | 151/2 R |
| 2,393,544 | 1/1946 | Lum | 151/2 R X |
| 3,668,977 | 6/1972 | Beidler | 92/17 |
| 3,707,204 | 12/1972 | Dussardier | 184/55 A |
| 3,731,763 | 5/1973 | Thrasher et al. | 184/7 D |

FOREIGN PATENTS OR APPLICATIONS 19,818  1898  United Kingdom ............... 151/2 R

*Primary Examiner*—Richard C. Pinkham
*Assistant Examiner*—Arnold W. Kramer
*Attorney, Agent, or Firm*—Norman Lettvin

[57] ABSTRACT

An airline lubricator is disclosed with a tamper-proof, oil-metering adjuster provided for adjusting the quantity of oil delivered by the lubricator, and for preventing tampering or accidental readjustment. The tamper-proof construction for a selectively adjustable screw controller includes a lock therefor wherein an elongated, rotatable, screw controller is provided with a splined portion, and the stationary body is also splined for cooperation with an axially movable lock collar that normally engages both the splines on the controller and the splines on the body to prevent tampering or accidental readjustment, and with a removable knob-like adjuster provided to selectively move and disengage the lock collar and to then also effect selective screw adjustment of the controller. When the adjuster is removed, the device becomes substantially tamper proof.

12 Claims, 4 Drawing Figures

ADJUSTABLE CONTROL AND LOCK MEANS THEREFOR, SUCH AS FOR USE WITH AN AIR-OPERATED LUBRICATOR

This is a division of application Ser. No. 315,496, filed Dec. 15, 1972.

BACKGROUND OF THE INVENTION

This invention relates to air line lubricators which dispense metered quantities of lubricant to a pneumatically-operated tool or the like.

Lubricators, connected in an air line between a pneumatic tool and an air source, for dispensing metered quantities of lubricant to the pneumatic tool in response to increased air flow rates are known in the art. Depending upon the particular purpose, prior art injectors have been known to provide for delivery of lubricant in only one of the following three modes: by delivering the oil to the tool through a tube external to the air line; by delivering the oil through a tube running within the air line; or by delivering a "lubricant mist" in the air line which is carried to the tool. It would be desirable to have a lubricator having greater adaptability as to the mode of delivery of lubricant.

Therefore, it is an object of this invention to provide an inline lubricator which is convertible to provide different types of oil delivery.

In the event the lubricant is not being received by the tool, it may be difficult to determine if the lubricator is operating properly. It is therefore another object of this invention to provide means associated with said lubricator for indicating proper operation of the lubricator.

All lubricators include flow rate sensors which sense the air flow rate and the demand for lubricant. However, it has been found that the prior art lubricators may consume or leak air. Thus, yet another object is to provide a flow-through lubricator in which the sensing system is substantially leak-free.

Air line lubricators also include mechanisms for adjusting the quantity of oil delivered by the lubricator. However, these adjustors have been subject to tampering or accidental readjustment. It is therefore another object to provide an oil delivery adjustor which cannot be accidentally readjusted and which is substantially tamper-proof.

These and other objects will become apparent from the following description and appended claims.

SUMMARY OF THE INVENTION

There is provided by virtue of this invention a lubricator for mounting in an air line to dispense small metered quantities of oil to a pneumatic tool, which is readily converted to deliver the oil to the tool: (1) through a conduit external of the air line; (2) through a line internal of the air line; or (3) as a mist in the air line. An indicator piston, positioned in a transparent housing mounted to the lubricator, reciprocates with the pumping of oil and can be visually observed so as to determine the operational condition of the lubricator.

A novel air flow rate sensor which moves in response to changes in flow rates above an actuation rate is provided which is substantially leak-free. Also provided is a metering adjusment mechanism which includes a knob that is axially movable toward the lubricator to a first position to adjust the oil flow rate, and is movable away from the lubricator to a second non-adjusting position or can be removed from the lubricator, thereby rendering it substantially tamper-proof.

These and other objects will become apparent from the following description and appended claims.

DESCRIPTION OF THE PREFERRED EMBODIMENT

Figure 1:
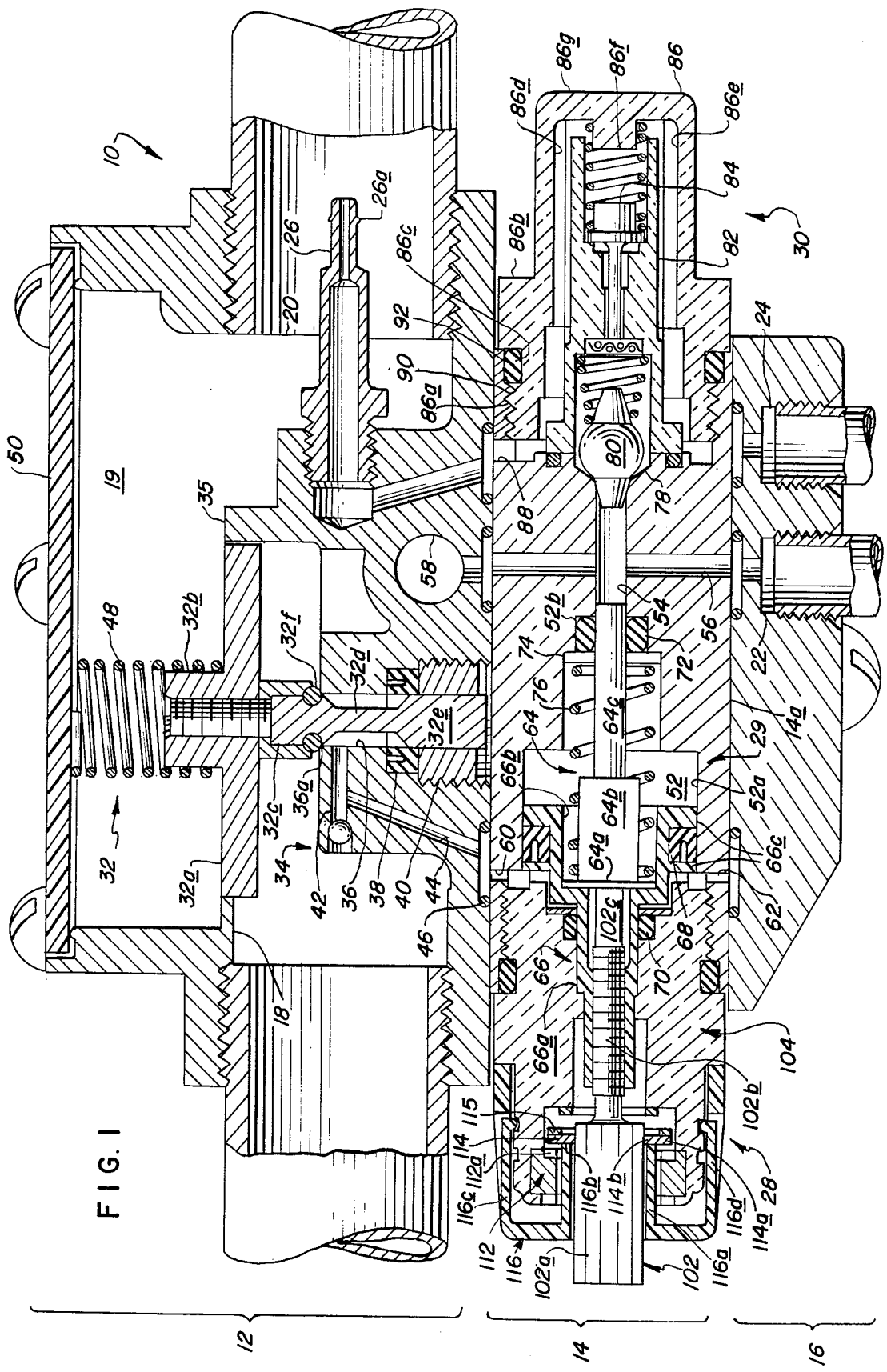
FIG. 1 is a longitudinal sectional view of the lubricator of this invention with the components being shown in their noflow position.

Referring now to the drawings, the lubricator 10 includes an upper body portion 12, middle body portion 14 and lower body portion 16. Incoming air entering the lubricator at an air inlet port 18 flows through a cavity 19 in the upper body and exits at the air outlet port 20. Oil enters the lubricator at the oil inlet port 22 in the lower body and can exit via an external port 24 or through an internal nozzle 26 at the air outlet port 20. An oil delivery adjuster assembly 28 is mounted to one end of the middle body and cooperates with an oil pump assembly 29 in the middle body. A pumping indicator assembly 30 is mounted to the other end of the middle body.

An air sensor assembly 32 is positioned in the cavity 19, and when activated by an increase in air flow rate above a predetermined actuation level, causes the pump assembly 29 to deliver a metered quantity of oil through the oil flow system of which the indicator assembly is part, to one of the oil exits 24 or 26. The adjustor assembly 28 permits adjustment of the stroke of the pump so as to vary the quantity of oil delivered.

AIR SENSOR ASSEMBLY

The air sensor assembly 32 includes a piston-and-valve-stem assembly which is positioned between the air inlet and outlet ports and against which all incoming air flows. The assembly includes a flat, circularly-shaped piston section 32a having an upstanding spring keeper and travel limiting post 32b on one side and carries on the other side a shaped valve stem which includes an upper O-ring carrying head 32c, a reduced shank section 32d and a lower head 32e.

The upper body includes a boss-like formation 34 which defines a sleeve-like section 35 for sliding and sealing cooperation with the piston 32a, and the formation 34 also defines a passageway 36 within which the valve stem moves. The upper end 36a of the passageway 36 provides a seat and port for the entry of air to the pump assembly 29 and is arranged for engagement and sealing by O-ring 32f. The lower end of passageway 36 is enlarged, and a lip-type seal 38 which sealingly cooperates with head 32e is positioned therein by the internally-bored plug 40. When the upper head 32c is seated, the lower head is positioned below the seal 38 but when the head 32c is unseated the lower head 32e engages the seal 38. The drilled holes 42 and 44 connect the passageway 36 to a sealed opening 46 which is arranged for communication with the pump assembly 29.

A coiled compression spring 48 engages the piston 32a, surrounds post 32b and engages the cover 50 so as to bias the piston assembly 32 toward a position where the enlarged head 32c is seated at port 36a. Incoming air exerts a force on the under side of piston 32a and when that force exceeds a predetermined value the piston moves upwardly against the spring 48 and the air passes into both the cavity 19 and the passageway 36. The upward movement of the piston is limited by engagement of the post 32b and the cover 50. When the force is reduced the piston returns to its lower seated position.

From this it is seen that the sensor assembly is substantially leak-free since when the piston is in the activated upper position the unit is pneumatically sealed by the engagement of the valve stem's lower head 32e and the lip-type seal 38. The pneumatic seal is maintained when the piston is in the unactivated lower position by the valve stem's upper head and the engagement of the O-ring 32f with the port 36a as well as engagement of the piston 32a with the body sleeve 35.

OIL PUMP ASSEMBLY

The center section 14a of the middle body 14 includes a step-shaped cylinder or chamber 52 which terminates in an axially-extending oil pumping passageway 54. The transverse oil supply hole 56 extends through the center section 14a, intersects the passageway 54 and connects the oil inlet 22 with a reservoir tap 58 in the upper body. The adjuster assembly 28 is threadably and sealingly received at the cylinder end of the section 14a and the indicator assembly 30 is threadably and sealingly received at the other end of the section 14a.

Air flowing to the pump assembly enters the section 14a through ports 60 or 62 and then flows against the air piston 66 which cooperates with the oil piston 64 to pump oil from the passageway 54 to one of the exits 24 or 26.

The air cylinder 66 is a hollow, elongated, step-shaped member having an internally-threaded end section 66a which opens to a hollow inner oil piston-receiving section 66b that is surrounded by the spaced peripheral flanges 66c which slideably engage the cylinder wall 52a. A V-shaped seal 68 is carried between the flanges and sealingly engages the wall 52a and an O-ring 70 sealingly engages the outer surface of the end section 66a so as to complete the air chamber seals.

The oil piston 64 has an enlarged head 64a which is axially movable within the piston-receiving section 66b, a reduced center section 64b which acts as a spring keeper, and an elongated end section 64c which slides within the bore 54 for pumping oil. An oil-sealing O-ring 72 in the small end 52b of the cylinder 52 engages the end section 64c for preventing oil leakage into the air cylinder. A retainer washer 74 holds the O-ring 72 in place and acts as a seat for the coiled compression spring 76 which surrounds the piston keeper section 64b, engages the enlarged head 64a, holds the oil piston against the air piston and biases both pistons toward the adjuster 28.

Air entering the port 60 urges the air piston 66 and oil piston 64 against the spring 76 and causes the piston end 64c to extend into the oil passageway 54. As the end 64c moves toward the indicator end of the passageway 54 it pumps the oil therein out of the passageway.

Figure 2:
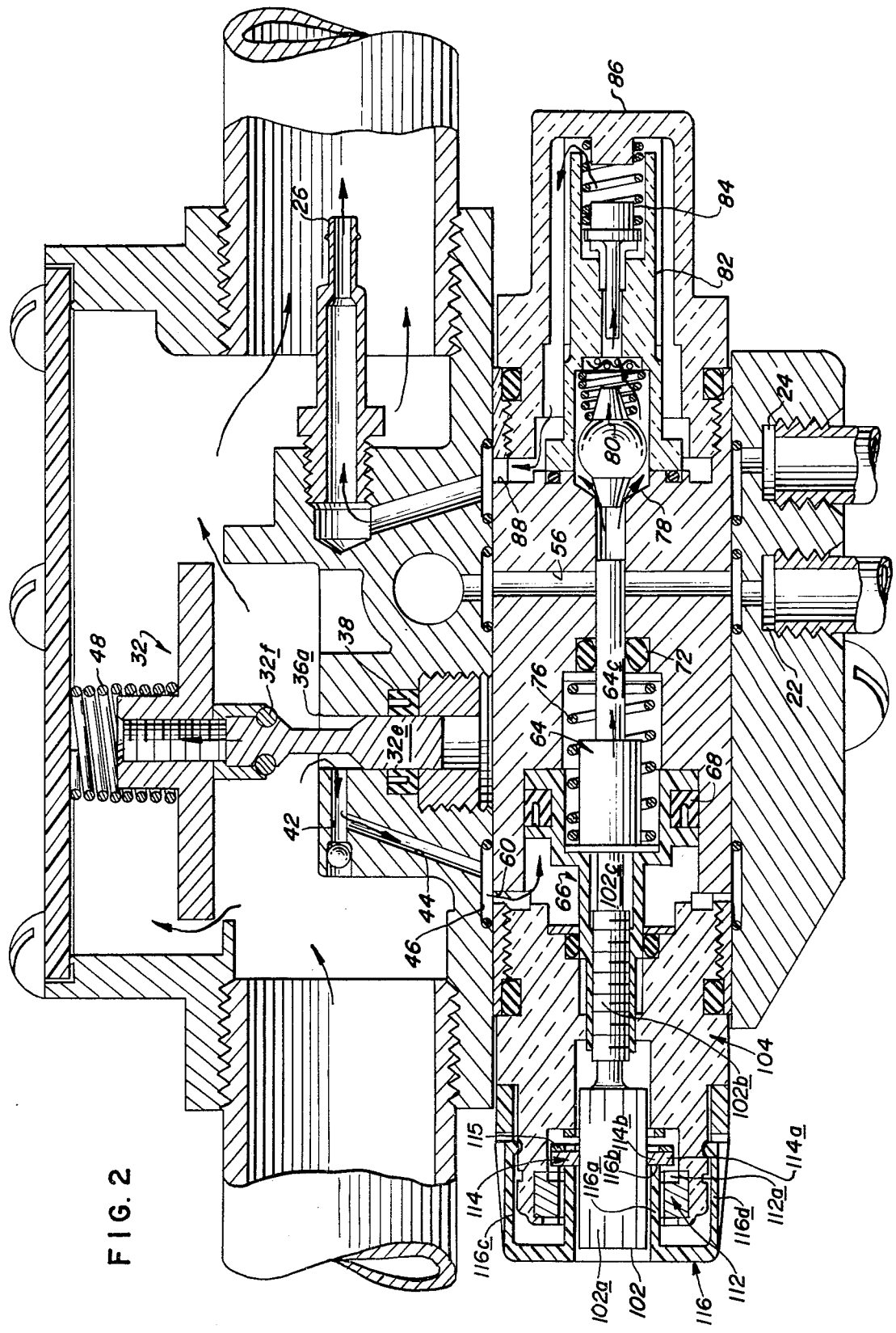
FIG. 2 is a sectional view similar to FIG. 1 with the components being shown in the flow position.
Figure 3:
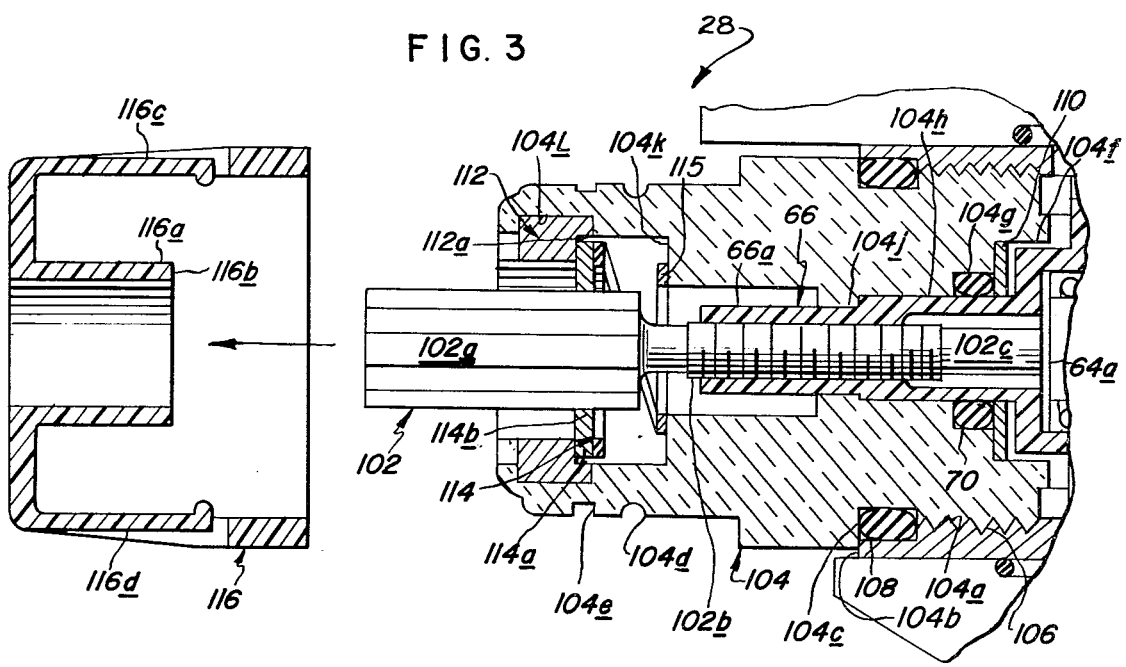
FIG. 3 is a greatly enlarged, fragmentary, longitudinal sectional view of the adjustment mechanism with the control knob removed therefrom.

When the rod end passes the supply hole 56 it closes off the oil supply and injects a "slug" of oil into the indicator assembly 30, as seen in FIG. 2.

When the air pressure is reduced the biasing spring urges the pistons back to their normal position with the rod end 64c retracted upstream of the supply hole 56 and the piston 66 abutting the adjuster assembly 28.

FLOW INDICATOR ASSEMBLY

Oil enters the indicator assembly 30 at seat 78 which is controlled by a check valve 80 that is mounted within an optically-clear sleeve 82, flows through the sleeve, past an indicator piston 84, out of the sleeve and into flow passages provided between the sleeve and an external optically-clear, elongated cap 86 and through an exit port 88 in the internally-threaded section 90 to the oil exit. The cap 86 has an externally-threaded end 86a for cooperation with the internally-threaded section 90 and an external knurled shoulder formation 86b which is arranged to abut the end of the threaded section 90 and which facilitates loosening, tightening and positioning of the cap. An O-ring 92 is positioned in a retaining groove 86c between the threads 86a and shoulder formation 86b for sealing the interior of the cap and preventing leakage therefrom. Internally, the cap includes opposed flow grooves 86d and 86e and an axially-projecting keeper post 86f on the transverse end wall 86g.

The inner sleeve 82 is axially elongated and telescopically fits within the cap 86. One end 82a is of reduced diameter so as to maintain a spaced relation between the sleeve and grooves 86d and 86e to permit flow therebetween. The intermediate section 82b fits snugly against the cap bore 86h so as to radially position the sleeve 82 within the cap 86. The end section 82c has a flat face 82d which abuts the middle section 14a and the O-ring 94 to assure sealed oil flow into the sleeve 82.

The sleeve 82 is provided with a check valve chamber 82e which has an upstream shoulder 82f against which the conical compression spring 96 seats so as to bias the check valve 80 in an upstream direction against the seat 78 for closing flow into passageway 54. A debris-collecting filter screen 98 is mounted across the flow path at the downstream end of the check valve chamber. An indicator piston chamber in which the piston 84 is movable, is provided downstream of the screen. The chamber includes an elongated passageway 82g which opens to a shoulder 82h and an open-ended section 82j.

The piston 84 includes an elongated stem 84a which slides within the passageway 82g, a disc-like section 84b arranged for engagement with the shoulder 82h and a post-like end section 84c. The compression spring 100 is positioned around the post 86f, against the transverse wall 86g, around the piston post 84c and against the disc section 84b so as to bias the piston against the shoulder 82h. Oil flowing into the chamber causes the piston to move axially toward the end wall against the spring 100 so as to indicate flow.

Figure 4:
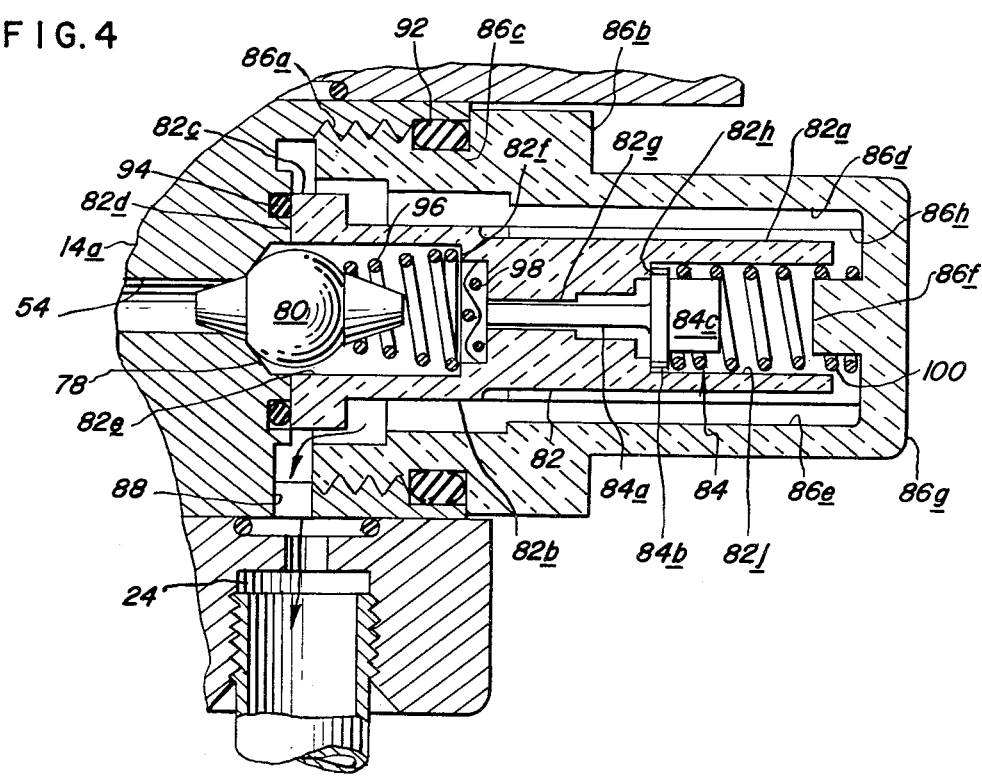
FIG. 4 is a greatly enlarged, fragmentary, longitudinal sectional view showing the indicator assembly with the lubricator converted for oil flow through an external line.

Flow from the indicating piston chamber is directed through the grooves such as 86d and 86e to the outlet port 88. By rotating the body 14 180°, the post 88 can be placed in communication with either the external conduit 24 as seen in FIG. 4 or the nozzle 26 seen in FIG. 1.

The nozzle is removable from the boss-like formation and is provided with an aerosol-tip configuration for injecting a heterosperse spray into the air line. A barb-like projection 26a is provided on the tip so that a capillary tube can be connected to the tip and run in the air line to the tool.

FLOW RATE ADJUSTER

The flow rate adjuster assembly 28 cooperates with the piston assembly 29 so as to reduce the stroke of the oil piston 64 by moving the oil piston 64 relative to the air piston 66. The adjuster screw 102 which has a splined end 102a, an externally-threaded intermediate section 102b, and an abutment stud 102c, threadably engages the threaded section 66a of the air piston. As the screw 102 is advanced, the end 102c engages the disc section 64a of the oil piston 64 and urges it against the biasing spring 76 thereby moving the oil piston 64 away from the threaded section 66a which effectively increases the quantity of oil delivered by increasing piston end 64c travel past supply hole 56.

The adjusted assembly 28 also includes a plug-like section 104 having external threads 104a at one end for cooperation with internal threads 106 in the middle section 14a. The plug is axially positioned on the body 14a by means of an external shoulder 104b that abuts the end face of the body section and an O-ring 108 disposed in an intermediate retaining groove 104c pneumatically seals the threaded section. The outer end of the plug has inner and outer detent grooves such as 104d and 104e.

The plug is internally bored for cooperation with the piston 66 and splined screw 102. The piston end includes an enlarged section 104f in which an O-ring retaining washer 110 is seated, a reduced section 104g in which the pneumatic sealing O-ring 70 is seated, a guide section 104h for sliding cooperation with the air piston stem, and an abutment shoulder 104j which cooperates with the piston stem to limit movement of the piston toward the adjuster end.

The outer end of the bore includes a shoulder 104k and a retaining section 104L within which an annular lock ring 112 is positioned. The ring 112 has an enlarged bore and a short, internally-splined section 112a which lockingly cooperates with the collar 114. The collar 114 includes external splines 114a which engage the spline 112a and internal splines 114b which engage the splines 102a of screw 102, to prevent rotation of the screw relative to the ring 112 but permit axial movement of the screw 102. A compressible spring 115 which seats against shoulder 104k holds the collar 114 against the spline 112a.

The adjuster cap 116 includes an internal boss 116a which is axially splined for cooperation with the screw splines 102a and has an end face 116b for abutment with the collar 114. The cap also includes a plurality of detent-grasping fingers such as 116c and 116d, the detent ends of which cooperate with detent grooves 104d and 104e.

In order to adjust the quantity of oil metered to the tool, the cap is slipped onto the spline 102a and pushed onto the plug until the detents on the fingers engage the inner detent groove 104d. In this position the boss end face 116b has engaged the lock collar 114 and disengaged the external collar splines 114a from lock ring splines 112a. The screw can now be freely rotated so as to adjust the position of the oil piston. By retracting the cap 116 to the position whereat the detents on the fingers engage the outer detent groove 104e the external splines 114a on collar 114 re-engage the splines 112a on ring 112 thereby preventing rotation of the screw. In order to render the adjuster substantially tamper-proof the cap 116 can be completely withdrawn from screw and adjuster.

OPERATION

In operation, air flowing into the inlet port 18 flows against the piston 32a so as to urge it against the biasing spring 48. If the force acting on the piston is sufficient to move it upwardly, air flows from beneath the piston into the cavity 19 and from there out the exit port 20. As the piston 32a moves upwardly the stem 32c moves upwardly and the sealing O-ring 32f opens the port 36a so that there is an annular space defined between the passageway 36 and the reduced intermediate section 32d, and at the same time, the lower end 32e sealingly engages the seal 38. Some of the incoming air flows to the port 60 and exerts a force on the piston 66 so as to move the piston axially within the chamber 52 toward oil passageways.

As the air piston 66 moves, it urges the oil piston 64 toward the check valve 80 so that the shank portion 64c moves axially within the passage 54 past the oil supply passageway 56 and forces a "slug" of oil against the check valve 80. The check valve 80 unseats and moves toward the filter 98 so that the oil passes around the check valve and through the filter 98. The oil entering the passageway 82g unseats the indicator piston 84 and moves it against the biasing spring 100 toward the post 86f. Oil flows around the indicator piston, into the groove-like passageway 86d and 86e and into the passageway 88. From the passageway 88 the oil flows to the nozzle 26 (as in FIG. 1) or the conduit 24 (as in FIG. 4). The nozzle injects the slug of oil into the air flowing from the chamber 19 in a manner so as to form a heterosperse mist in which the oil droplets have a size between 1.0 and 5.0 microns. Rather than injecting oil into the flowing air, a capillary tube may be fitted to the end of the nozzle 26 and to the pneumatic tool to carry the oil directly to the tool by a line internal of the air line.

When the air pressure entering the inlet port 20 drops below the activation level, the air piston 32a moves into sealing engagement with the upper body 18a, under the force of the biasing spring 48 until the O-ring 32f seats against the seat 36a. When this occurs the force on the air piston is reduced and the biasing spring 76 urges the oil piston 64 against the air piston 66 until the air piston bottoms on the shoulder 104j. This forces the remaining air back through the passageway 60 and out through the plug 40.

The indicator piston 84 moves with each pulse or slug of oil that is being injected into the system and thus if the unit if operating properly, the operator can view the axial movement of the piston. If the piston is not moving, it would be an indication to him that the air flow into the sensor assembly is improper or that the lubricator is not working properly. Furthermore, visual observation can be made of the condition of the filter 98 so as to determine whether or not the cap 86 should be removed for cleaning.

It will be appreciated that numerous modifications and changes can be made to the embodiments shown herein without departing from the spirit and scope of this invention.

What is claimed and desired to be secured by Letters Patent of the United States is:

1. In a selectively adjustable control and lock means therefor that includes body means with a screw-threaded portion, an elongated controller whose position relative to said body means is selectively adjustable longitudinally in opposite directions by said controller having a portion thereof screw-threaded to said screw-threaded portion of said body means, and movable lock means operatively associated with the controller to selectively permit or prevent further screw movement of the controller, the improvement comprising, in combination:
   the controller having an elongated portion that is longitudinally splined;
   ring means provided on thhe body means positioned concentrically of the longitudinally splined portion of the controller and spaced therefrom, second spline means on said ring means;
   a lock collar splined to said longitudinally splined portion of the controller and axially movable longitudinally thereof, said lock collar bridging the space between the controller and the concentric ring means, second spline means on the lock collar arranged for engagement with said second spline means on the ring means when the lock collar is in axial position adjacent the ring means but being free of the second spline means on the ring means when the lock collar has been moved axially away from said ring means;
   spring means normally biasing the lock collar toward said ring means;
   and an adjuster for selectively rotating the controller, said adjuster including means for selectively axially displacing the lock collar away from the ring means against the bias of the spring means.

2. A construction as in claim 1 wherein said adjuster includes a boss splined to said longitudinally splined portion of the controller, said boss having a lock collar engaging portion positioned so that when the adjuster is moved axially toward the lock collar, it engages the lock collar to move the lock collar away from the ring means.

3. A construction as in claim 2 wherein the adjuster includes a knob-like cap operatively associated with the boss to selectively move the boss in opposite directions axially of the controller, and to rotate the boss and controller in unison when the lock collar has been disengaged from the ring means.

4. A construction as in claim 1 wherein the body means provides a mounting plug surrounding the ring means, the adjuster being a cap-like member that telescopes onto the mounting plug and is selectively movable axially relative to the mounting plug, means on the adjuster and mounting plug for retaining the adjuster in at least two axial spaced positions on the plug, at one of said positions the adjuster holding the lock collar away from thhe ring means against the bias of said spring means.

5. A construction as in claim 4 wherein the adjuster may be removed from the mounting plug to prevent tampering or accidental readjustment of the controller.

6. A construction as in claim 4 wherein the means for retaining the adjuster in said one position against the bias of the spring means includes a circumferential detent groove on the plug, and inwardly extending, resiliently mounted, detents on the cap-like member adapted to enter the circumferential detent groove, when said detents are moved axially into alignment with the circumferential detent groove, and providing resistance to separation of the detents from the groove that is greater than the bias force of the spring means.

7. A construction as in claim 1 wherein the body means includes a housing, an air piston and an oil piston therein, and the spacing between the pistons being selectively variable through the selective longitudinal positioning of the controller.

8. A construction as in claim 7 wherein the air piston has a tubular stem, a portion of the inner wall of the tubular stem being screw-threaded, and the controller providing an elongated portion that extends through the tubular stem of the piston and has a screw-threaded portion thereof operatively connected to the tubular stem, so that the controller may be selectively adjusted longitudinally relative to the tubular stem of the air piston.

9. In a selectively adjustable control and a lock means therefor that includes body means with a screw-threaded portion, an elongated controller whose position relative to said body means is adjustable longitudinally in opposite directions by said controller having a portion thereof screw-threaded to said screw-threaded portion of said body means, and movable lock means operatively associated with the controller to selectively permit or prevent further screw movement of the controller, the improvement comprising, in combination:
   portions of said body means and of said controller, spaced from said screw-threaded portions of the body means and controller, being splined;
   said splined portions of the body means and controller being concentrically arranged to define an annular space therebetween, and being of different longitudinal extent relative to each other;
   lock collar means movable longitudinally of said splined portions, and bridging said annular space between said concentric portions of the body means and controller, and having two splined portions respectively for engagement and cooperation with the spaced, splined portions of both the body means and controller, simultaneously when the lock collar means are at one longitudinal position, and for splined engagement and cooperation with only one of the concentric splined portions when the lock collar means are at a second longitudinal position;
   spring means normally biasing the movable lock collar means to said one longitudinal position; and
   an adjuster for selectively moving the lock collar means to the second longitudinal position.

10. A construction as in claim 9 including resiliently mounted detent means operatively associated with the adjuster for maintaining the lock collar means at said second longitudinal position against the bias of said spring means.

11. A construction as in claim 9 wherein the adjuster is splined to the controller and is operative to rotate the controller after the adjuster has moved the lock collar means to the second longitudinal position.

12. A construction as in claim 9 wherein the body means is constructed and arranged to define a hollow plug through which the elongated controller extends axially, a ring-like member in the plug surrounding and spaced from the controller and with splines formed therein at one axial face thereof said ring-like member being the splined portion of the body means
   the lock collar means being a disc-like member that is spring biased toward said splined face of the ring-like member;

and the adjuster being a cap-like member that is adapted to telescope onto the hollow plug and providing a boss portion that is movable in the annular space between the ringlike member and the controller for selectively moving the lock collar means.

* * * * *